Sept. 20, 1949. T. MARTIN 2,482,195
SPECTACLE FRAME
Filed June 3, 1948 2 Sheets-Sheet 1
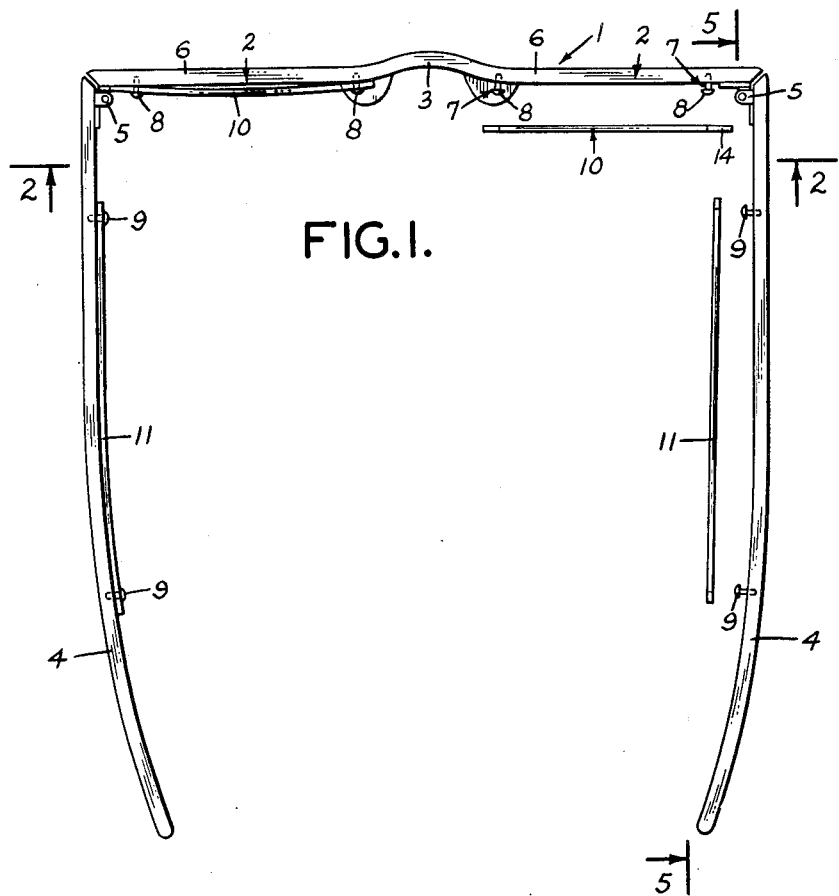
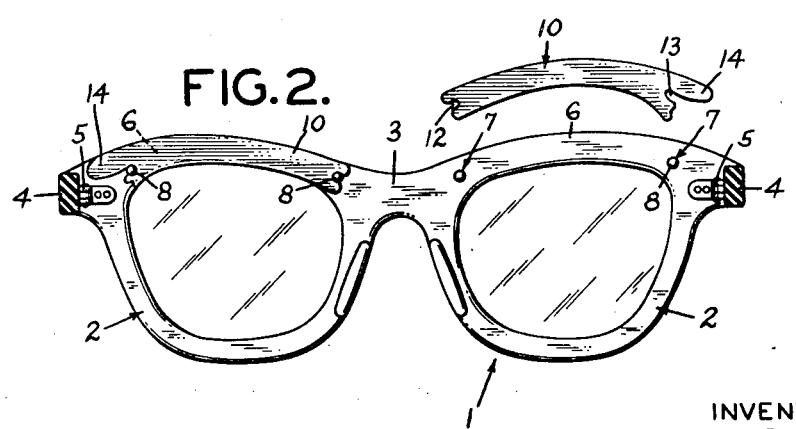
INVENTOR.
THEODORE MARTIN
BY
Klein, Alexander & Pohl
ATTORNEYS.

Sept. 20, 1949.  T. MARTIN  2,482,195
SPECTACLE FRAME
Filed June 3, 1948  2 Sheets-Sheet 2
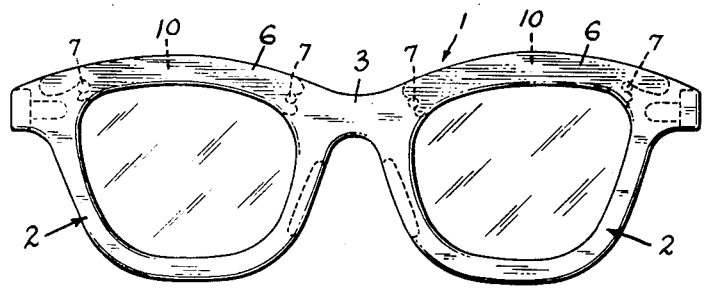
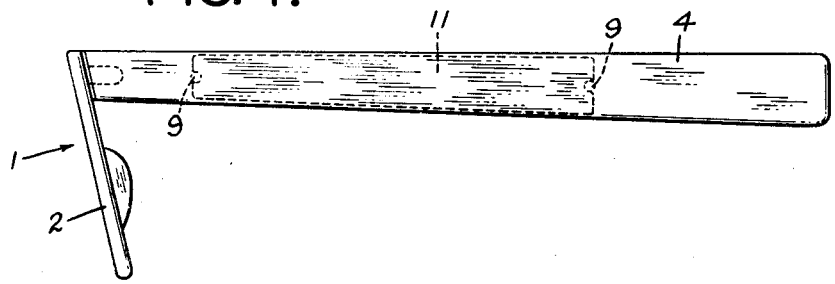
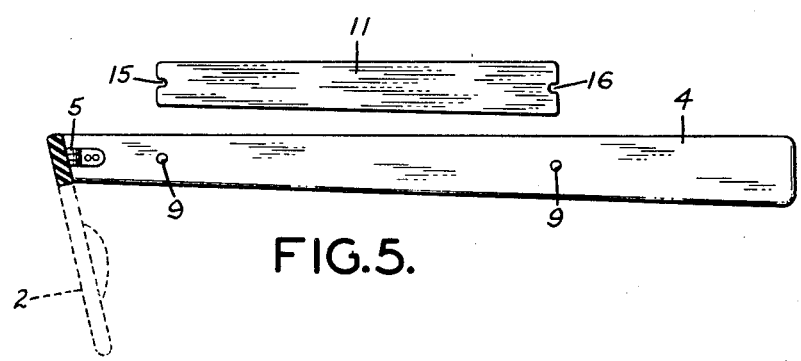
INVENTOR.
THEODORE MARTIN
BY
ATTORNEYS.

Patented Sept. 20, 1949

2,482,195

UNITED STATES PATENT OFFICE 2,482,195

SPECTACLE FRAME

Theodore Martin, Sunnyside, N. Y.

Application June 3, 1948, Serial No. 30,792

3 Claims. (Cl. 88—41)

This invention relates to spectacle frames made of transparent or translucent material, the color of parts whereof may be changed at will.

The object of the invention is to provide transparent or translucent spectacles, particularly for use by women, the color whereof may be varied at will in portions thereof to provide a color scheme, harmonious or non-harmonious, according to the determination of the user, in relation of the color or colors of the user's wearing apparel or accessories.

The user by this invention may select a particular color which she desires to exhibit in connection with her spectacles and apply such color by a few simple operations readily performed by hand without the exercise of any skill or the use of any particular tools.

In the drawings Fig. 1 is a top plan view of a spectacle frame illustrating means of applying this invention thereto; Fig. 2 is a section on the line 2—2 of Fig. 1; Fig. 3 is a front view of the lens carrying member; Fig. 4 is a side view of the spectacles and Fig. 5 is a section on the line 5—5 of Fig. 1.

The spectacle frame 1 comprises the lens carrying members 2—2, the bridge piece 3 and the temple bars 4—4 which are pivoted at 5—5 to permit the temple bars to be folded against the members 1. Each of the upper bars 6 of the lens carrying members 2—2 are provided on their inner faces, between the bridge piece 3 and its hinge 5, with two spaced pins 7—7. Such pins are located substantially on a vertical line extending across the outer edges of the lenses and spaced inside of the bridge piece 3 and the hinge 5. The supporting pins have a shank portion which is set and secured in recesses in the bars 2 with the underside of the heads 8 spaced approximately $\frac{1}{32}$ of an inch from the inner surface of the bar 4. Like headed pin members 9 are secured on the inside of the temple bars 4, one spaced inside of each free end of the said temple bars and another spaced inwardly of each hinge.

A multiplicity of strips are provided of two different forms—one form 10 to fit between the pins on the upper bars 6 and another form 11 to fit between the pins on the temple bars 4. The strips 10 are generally of the same contour as the contour of the bars 6 between the pins 7—7 and are provided at their ends with recesses 12—13, one end of each strip 10 being provided with a curved finger 14. The strips 11, for the temple bars, are generally rectangular in shape with a slight taper to conform to the width and taper of the inside surface of the temple bars. Such strips 11 are likewise provided in their ends with recesses 15—16. The distance between the recesses 12—13 and 15—16 are such that the strips may be snapped beneath their respective pin heads, against the shanks of the pins and retained flat against the spectacle parts, by reason of their inherent resiliency. The strips 10 and 11 are made from thin sheets of synthetic plastics, such as one of the cellulose compounds, Lucite and the like. Such sheets have inherent resiliency or springiness and therefore readily adaptable for use in connection with this invention. A series of sets of such strips 10 and 11 are provided. Each member of a set of the same color and each set of a different color. Each set will consist of two strips 10 and two strips 11 of the same color. Preferably, the series of strips are provided in the form of a kit of eight or more colors, for instance, green, orange, blue, white, red, black and gold, and one set made up of multiple colors.

The user selects the particular type of color which she desires to use and snaps the strips 10, shaped to fit the bars 6, underneath the heads 8 by placing the recesses 12—13 underneath said heads. The strips 11 are secured in the same manner beneath the heads of the pins 9—9.

When the strips 10—10 are positioned on their companion pins the fingers 14 extend close to the plates, of the hinges 5, secured to the lens carrying members 2.

The user may, at will, remove the four strips by lifting them from engagement with their pins and substitute a differently colored set of strips. The pins are small enough so as not to disfigure the appearance of the spectacle frames and the glasses may therefore be used without the colored strips.

The strips show color on both surfaces which permit interchangeability of the two strips for the upper bars and interchangeability of the strips for the temple bars.

I claim:

1. A spectacle frame made of transparent material and having lens carrying members and temple bars, comprising pins secured in the material in each of the upper bars of the lens carrying members, two of said pins being spaced inside of the bridge piece of the said spectacles and the other two pins being spaced inside of the temple bar hinges whereby the pins are arranged in pairs, one pair on each upper bar of the lens carrying members, the pins of each pair being spaced apart approximately equal to the distance across the lens opening, each pin having a head extending inwardly and spaced from the inner surface of said upper bar, two substantially like strips of material of a contrasting color to that of the material of the lens supporting members, said strips of material having inherent resiliency and generally shaped to the contour of said upper bars, recesses in the ends of said strips, the distance from the base of one recess to the other recess being slightly greater than the distance between the pins whereby the strips may be snapped on said pins beneath the heads thereof and retained in position by reason of their resiliency.

2. A spectacle frame of the character set forth in claim 1 in which the inside portion of each temple bar is provided with a pair of headed pins, said pins of each pair being spaced apart, said heads being spaced from the inner surface of said temple bars, two substantially like strips of material of a contrasting color to that of the material of the temple bars, said strips of material having inherent resiliency and generally shaped to the contour of that portion of the temple bars between said pins, recesses in the ends of said strips, the distance from the base of one recess to the other recess being slightly greater than the distance between the pins whereby the strips may be snapped on said pins beneath the heads thereof and retained in position by reason of their resiliency.

3. A spectacle frame made of transparent material and having lens carrying members and temple bars, a pair of headed pins secured in the inner surface of each of the upper bars of said lens carrying members and said temple bars, the members of each pair of pins being spaced apart, four thin strips of inherently resilient material of a contrasting color to that of the material of said spectacle frame, two of said strips of resilient material being shaped generally to conform to the configuration to that portion of the upper bars of said lens carrying members between said pins, the other two strips being shaped generally to conform to the configuration to that portion of the temple bars between the pins thereon, apertures at the end portions of said strips, the distance between the apertures of the strips conforming to the shape of said upper bars being slightly less than the distance between the pins carried by said upper bars and the distance between the apertures in said temple bars being slightly less than the pins carried by said temple bars whereby said strips may be snapped in position and retained by reason of their inherent resiliency.

THEODORE MARTIN.

REFERENCES CITED

The following references are of record in the file of this patent:

UNITED STATES PATENTS

| Number | Name | Date |
|---|---|---|
| 1,310,077 | Heaford | July 15, 1919 |

FOREIGN PATENTS

| Number | Country | Date |
|---|---|---|
| 474,822 | France | Jan. 4, 1915 |
| 466,034 | Great Britain | May 20, 1937 |